US009703373B2

(12) United States Patent
Kohlhoff et al.

(10) Patent No.: US 9,703,373 B2
(45) Date of Patent: Jul. 11, 2017

(54) USER INTERFACE CONTROL USING GAZE TRACKING

(71) Applicant: Google Inc., Mountain View, CA (US)

(72) Inventors: Kai Jochen Kohlhoff, Foster City, CA (US); Xiaoyi Zhang, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 30 days.

(21) Appl. No.: 14/694,131

(22) Filed: Apr. 23, 2015

(65) Prior Publication Data

US 2015/0309569 A1 Oct. 29, 2015

Related U.S. Application Data

(60) Provisional application No. 61/983,232, filed on Apr. 23, 2014.

(51) Int. Cl.
*G06F 3/01* (2006.01)
*G06F 3/0482* (2013.01)
(Continued)

(52) U.S. Cl.
CPC .............. *G06F 3/013* (2013.01); *G06F 3/012* (2013.01); *G06F 3/0482* (2013.01);
(Continued)

(58) Field of Classification Search
CPC ........ G06F 3/013; G06F 3/0482; G06F 3/012; G06F 3/04842; G06K 9/00604;
(Continued)

(56) References Cited

U.S. PATENT DOCUMENTS 6,637,883 B1 10/2003 Tengshe et al.
8,334,907 B2 12/2012 Kim
(Continued)

FOREIGN PATENT DOCUMENTS

EP 1968006 9/2008

OTHER PUBLICATIONS

Blanz et al. in "Face Recognition Based on a Fitting a 3D Morphable Model" published by IEEE Computer Society in the IEEE Transactions on Pattern Analysis and Machine Intelligence, vol. 25, No. 9, Sep. 2003.*
(Continued)

*Primary Examiner* — Liliana Cerullo
(74) *Attorney, Agent, or Firm* — Fish & Richardson P.C.

(57) ABSTRACT

Methods, systems, and apparatus, including computer programs encoded on a computer storage medium, for identifying a direction in which a user is looking. In one aspect, a method includes receiving an image of a sequence of images. The image can depict a face of a user. A template image for each particular facial feature point can be compared to one or more image portions of the image. The template image for the particular facial feature point can include a portion of a previous image of the sequence of images that depicted the facial feature point. Based on the comparison, a matching image portion of the image that matches the template image for the particular facial feature point is identified. A location of the matching image portion is identified in the image. A direction in which the user is looking is determined based on the identified location for each template image.

16 Claims, 5 Drawing Sheets

(51) Int. Cl.
*G06F 3/0484* (2013.01)
*G06K 9/00* (2006.01)
*G06T 7/73* (2017.01)

(52) U.S. Cl.
CPC ....... *G06F 3/04842* (2013.01); *G06K 9/0061* (2013.01); *G06K 9/00248* (2013.01); *G06K 9/00261* (2013.01); *G06K 9/00604* (2013.01); *G06T 7/74* (2017.01); *G06T 2207/30201* (2013.01)

(58) Field of Classification Search
CPC ............. G06K 9/0061; G06K 9/00248; G06K 9/00261; G06T 7/0044; G06T 2207/30201; G06T 7/74
See application file for complete search history.

(56) References Cited

U.S. PATENT DOCUMENTS

| | | | |
|---|---|---|---|
| 8,340,366 | B2 | 12/2012 | Masuda |
| 8,401,251 | B2 | 3/2013 | Sasahara |
| 8,599,266 | B2 | 12/2013 | Trivedi |
| 2006/0133672 | A1 | 6/2006 | Li |
| 2008/0187175 | A1 | 8/2008 | Kim et al. |
| 2010/0125816 | A1 | 5/2010 | Bezos |
| 2012/0230545 | A1 | 9/2012 | Zhang |
| 2012/0272179 | A1 | 10/2012 | Stafford |
| 2015/0169938 | A1* | 6/2015 | Yao .................... G06K 9/00261 382/103 |

OTHER PUBLICATIONS

D. Cristinacce and T.F.Cootes, "Facial Feature Detection and Tracking with Automatic Template Selection" from the Proceedings of the 7th International Conference on Automatic Face and Gesture Recognition (FGR'06), published by IEEE in Feb. 2006.*

Prabhu et al., 'Facial Recognition Using Active Shape Models, Local Patches and Support Vector Machines,' [online][Retrieved on Apr. 23, 2015]; Retrieved from the Internet URL: http://www.contrib.andrew.cmu.edu/~kseshadr/ML_Paper.pdf; 8 pages.

International Search Report and Written Opinion in International Application No. PCT/US2015/027260, mailed Jul. 15, 2015, 14 pages.

International Preliminary Report on Patentability in International Application No. PCT/US2015/027260, mailed Nov. 3, 2016, 11 pages.

* cited by examiner

USER INTERFACE CONTROL USING GAZE TRACKING

CROSS REFERENCE TO RELATED APPLICATION

This application claims the benefit under 35 U.S.C. §119(e) of U.S. Provisional Patent Application No. 61/983,232 filed on Apr. 23, 2014, entitled "USER INTERFACE CONTROL USING GAZE TRACKING," the entire content of which is hereby incorporated by reference.

BACKGROUND

Input devices for computers and other electronic devices rely mostly on touch interfaces, such as keyboards, mice, touch pads, and touchscreens. These touch interfaces generally require efficient eye-to-hand coordination in combination with hand-to-screen-cursor coordination to interact with objects displayed by the electronic device. Voice recognition techniques can remove or reduce the coordination effort required by touch interfaces. For example, a user may provide a command using voice input and the voice recognition system can convert the command into a machine-readable instruction for the electronic device.

SUMMARY

This specification describes technologies relating to gaze tracking.

In general, one innovative aspect of the subject matter described in this specification can be embodied in methods that include the actions of receiving an image of a sequence of images, the image depicting a face of a user; for each particular facial feature point of facial feature points of the face depicted in the image: comparing a template image for the particular facial feature point to one or more image portions of the image, the template image for the particular facial feature point including a portion of a previous image of the sequence of images that depicted the facial feature point; identifying, based on the comparison, a matching image portion of the image that matches the template image for the particular facial feature point; and identifying, in the image, a location of the matching image portion; and determining a direction in which the user is looking based on the identified location for each template image. Other embodiments of this aspect include corresponding systems, apparatus, and computer programs, configured to perform the actions of the methods, encoded on computer storage devices.

These and other embodiments can each optionally include one or more of the following features. Aspects can include receiving the previous image; detecting the face in the previous image; in response to detecting the face in the previous image, fitting a shape model to the face, the fitted shape model specifying a relative position of the facial feature points; and generating, from the previous image, the template image for each facial feature point.

Identifying the matching image portion of the image for the particular facial feature point can include determining a similarity score for each of the one or more image portions of the image, the similarity score for a particular image portion of the image specifying a level of similarity between the template image for the particular facial feature point and the particular image portion; and selecting the image portion having the greatest similarity score as the matching image portion.

Comparing the template image for the particular facial feature point to the one or more image portions of the image can include identifying the one or more image portions for comparison in response to the one or more image portions being located in the image within a threshold distance of a location from which the template image was extracted from the previous image.

Determining the direction in which the user is looking based on the identified location for each template image can include determining an orientation of the user's face in the image based on a relative location of the matching image portion for each template image with respect to a location of the matching image portion for one or more other template images.

Aspects can include determining that the user is looking at a particular object presented on a display based on the determined direction in which the user is looking; and causing an operation to be performed on the particular object in response to determining that the user is looking at the particular object. Determining that the user is looking at a particular object presented on the display can include determining that the user is looking at the particular object based on a location of pupil of the user in the image and the determined direction.

Aspects can include determining a portion of a display at which the user is looking based on the determined direction in which the user is looking; detecting a location of a pupil of the user in the image; and determining a sub-portion of the portion of the display at which the user is looking based on the location of the pupil. Aspects can include receiving a subsequent image of the sequence of images, the subsequent image being received subsequent to receipt of the image; determining that the user is looking at the portion of the display based on the subsequent image; determining that a location of the pupil in the subsequent image is different from the location of the pupil in the image; and causing an operation to be performed on a user interface element displayed in the portion of the display in response to determining that the location of the pupil in the subsequent image is different from the location of the pupil in the image. The operation can include moving a cursor across the display based on the location of the pupil in the image and the location of the pupil in the subsequent image.

Particular embodiments of the subject matter described in this specification can be implemented so as to realize one or more of the following advantages. Template image comparison techniques described herein can use images of a user's face to provide an efficient and relatively quick process to determine a direction in which a user is looking. A combination of individual techniques, e.g., face model fitting in combination with template image comparison techniques, allow for efficient processing that delivers high spatial resolution in real-time even on low-performance devices and using low resolution images. Thus, images captured from webcams and cameras installed on mobile electronic devices, e.g., smartphones and tablet computers, can be used to detect a user's viewing direction, without the need for expensive and bulky sensors. The combination of face model fitting and template image comparison techniques reduces the data processing demand by greatly reducing the computational complexity of the image analysis techniques used to determine the direction in which the user is looking.

User interface elements can be controlled based on a user's viewing direction and/or gestures, reducing the need for touch-based control without distracting others. For example, using gaze tracking to interact with user interface elements can be more suitable than voice control in public places, offices, or around other people as gaze tracking does not require sound input that may distract others.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system can determine an orientation of a user's face using one or more images of the user's face, for example, images obtained from a video feed or other sequence of images. The system can use the determined orientation to determine a viewing direction of the user. For example, the viewing direction may specify a direction in which the user is looking with respect to a display. Objects, e.g., icons, text, or applications, presented on the display can be controlled based on the user's viewing direction and/or changes in the user's viewing direction. For example, the system may determine that the user is looking at a particular icon presented by the display based on the user's viewing direction. In response to determining that the user has viewed the icon for at least a threshold amount of time, e.g., two or more seconds, or that the user has made a particular gesture, e.g., eye blinking, the system may cause an action to be performed with respect to the icon, such as a selection of the icon.

In some implementations, the orientation of the user's face may be determined using template image comparison techniques. The system may use face detection techniques to detect the presence of a face within an image. The system can also fit a shape model for a generic face to the user's face detected in the image. For example, the shape model may specify the position of particular facial features, e.g., nose, eyes, and an outline of the face, for an average size and shape face. The system can superimpose the shape model over the user's face in the image and move the positions of the facial features to overlap with corresponding features of the user's face to fit the shape model to the user's face. The fitted shape model can specify the relative position of the facial features for the user's face in the image.

The system can also extract template images for each facial feature. A template image for a particular facial feature may include a portion of the image at the location of the particular facial feature in the image. For example, the template image for a portion of the nose of the detected face may be the portion of the image that includes the portion of the nose. To determine the orientation of the user's face in a subsequent image, the system can compare the template images to portions of the subsequent image to identify a portion of the subsequent image that matches each template image. The system can use the relative positions of the matching portions to determine the orientation of the user's face in the subsequent image. For example, if the relative positions of the matching image portions indicate that the distance between the right side of the user's face and the user's nose is greater than the distance between the left side of the user's face and the user's nose, then the system may determine that the user is looking to the left. The difference between the two distances can be used to determine how far to the left the user is looking.

The system can use the determined orientation of the user's face and the location of a display with respect to the user's face to determine a location on the display at which the user is looking. An operation can be performed with respect to an object, e.g., icon, text, image, or other UI object, that is located at or near the determined display location. The system may cause a content item, e.g., an advertisement, to be displayed in a location based on the location on the display at which the user is looking. For example, the system may provide data that cause the content item to be displayed prominently in the user's field of view.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Figure 1:
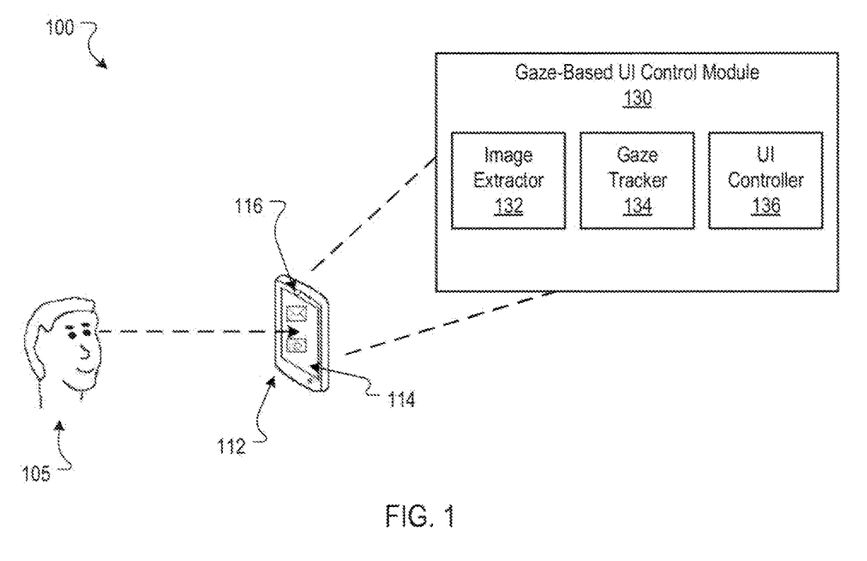
FIG. 1 is an environment in which an example gaze-based user interface (UI) control module performs actions on displayed objects based on a viewing direction of a user.

FIG. 1 is an environment 100 in which an example gaze-based UI control module 130 performs actions on displayed objects based on a viewing direction of a user. The gaze-based UI control module 130 may be implemented in software and/or hardware. The gaze-based UI control module 130 can be installed on or communicably coupled to, e.g., wirelessly or wired, an electronic device 112.

The electronic device 112 may be a smartphone, a tablet computer, a gaming system, a navigation system, or another type of electronic device that, for example, includes or is communicably coupled to a display 114. The example electronic device 112 also includes a camera 116 that can capture still images and/or video. For example, the electronic device 112 may be a smartphone that is equipped with a camera that can capture still images and video. The camera 116 can also be separate from the electronic device 112. For example, the camera 116 may be a webcam that is communicably coupled to the electronic device 112. The camera 116 can capture still images and/or video of a user 105.

In some implementations, the electronic device 112 is a device for determining a viewing direction of a user for use in enabling the user to control or interact with other objects. For example, the electronic device 112 may be installed in a vehicle, e.g., car, boat, or airplane, to enable a user to interact with systems of the vehicle. In a particular example, the electronic device 112 may enable a user to interact with a radio, navigation system, or other system of a car based on the direction in which the user is looking and/or gestures made by the user. To enable such interactions, the electronic device 112 may be in data communication, e.g., wired or wirelessly, with the vehicle's system(s). The electronic device 112 may be installed, e.g., removably attached, to the dashboard of a car to capture images for use in determining the user's viewing direction.

In another example, the electronic device 112 may enable a user to interact with a head-up display (HUD), e.g., projected onto windscreen or windshield. For example, information can be displayed on a windscreen using a HUD. The electronic device 112 may enable a user to interact with information presented by the HUD based on the direction in which the user is looking and/or gestures made by the user. This allows the user to change the information presented by the HUD without looking away from the road. In some implementations, the user may press a button, e.g., located on the steering wheel, to initiate interaction with the HUD using gaze tracking and/or gestures. In this way, the information displayed by the HUD doesn't change inadvertently, distracting the driver.

The gaze-based UI control module 130 can determine a viewing direction of the user 105 based on images of the user 105 captured by the camera 116. The gaze-based UI control module 130 can also cause actions to be performed with respect to objects shown on the display 114 based on the user's viewing direction. For example, the gaze-based UI control module 130 can use the determined viewing direction of the user, e.g., along with information specifying the location of the user's face with respect to the display 114, to determine whether the user 105 is looking at a particular object shown on the display 114. If so, the gaze-based UI control module 130 can cause an action to be performed with respect to that object, such as cause the object to be selected or manipulated in some way. The actions can also be initiated using a gesture, such as eye blinking, head tilting, or head leaning, as described in more detail below. For example, if the object is text displayed by a word processor, the gaze-based UI control module 130 may interact with the word processor to highlight text viewed by the user 105 in response to the user making a particular gesture.

The gaze-based UI control module 130 includes an image extractor 132. The image extractor 132 can extract images from a video feed or other sequence of images. For example, the gaze-based UI control module 130 may receive a video feed from the camera 116. The image extractor 132 can extract individual images from the video feed for use by other components of the gaze-based UI control module 130.

The gaze-based UI control module 130 also includes a gaze tracker 134. The gaze tracker 134 uses images of the user 105 to determine whether the user 135 is looking at the display and, if so, what portion of the display 114 the user 105 is viewing. For example, the gaze tracker 134 may use images captured by the camera 116 or images extracted by the image extractor 132 to make the determinations(s). In other implementations, the gaze tracker 134 can use the images of the user 105 to determine what, if any, object the user 105 is viewing outside of a display. For example, the gaze tracker 134 can use the images of the user 105 to determine what object of a vehicle the user 105 is viewing.

To determine the viewing direction of the user 105, the gaze tracker 134 can detect the user's face in an image. In some implementations, the gaze tracker 134 uses a face-detection technique that detects the presence of a face based on colors and shapes detected in the image. For example, the gaze tracker 134 may identify areas of the image that have a color that corresponds to a skin color and determine the shape of area(s) of the image that have the corresponding color. The gaze tracker 134 may then determine whether the shapes, e.g., when combined, matches or is similar to that of a face. In some implementations, the gaze tracker 134 uses Eigenfaces, Viola-Jones object detection framework, or another appropriate face/object detection technique to detect the user's face in an image.

Figure 3:
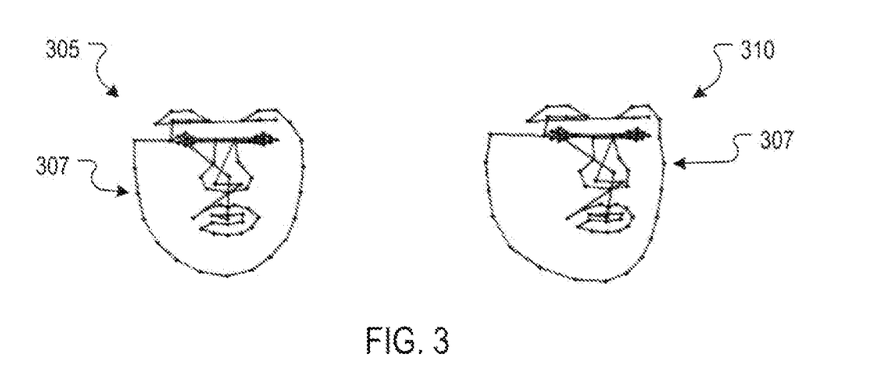
FIG. 3 depicts diagrams of an example shape model that includes facial feature points for a face.

If the gaze tracker 134 detects a face in the image, the gaze tracker 134 can fit a shape model to the user's face that was detected in the image. The shape model specifies the relative location of facial feature points of a face, such as a generic or average user face. For example, the shape model may specify the relative locations of points that outline at least a portion of a face and/or points that specify interior facial features such as the eyes, nose, mouth, and/or eyebrows. An example shape model is depicted in FIG. 3 and described below.

Figure 4:
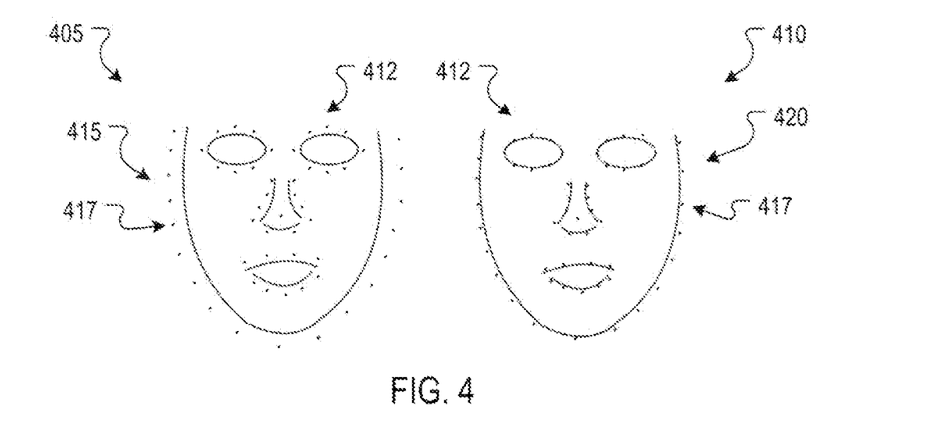
FIG. 4 depicts a shape model that includes facial feature points being fitted to an image of a user's face.

The gaze tracker 134 can fit the shape model to the face detected in the image to generate a fitted shape model for the user's face. To fit the shape model to the user's face, the gaze tracker 134 can superimpose the shape model over an image of the user's face and move the facial feature points along the image to align the face model with the user's face. For example, if the user's face is thinner than the face model, the gaze tracker 134 may move the facial feature points that outline the cheeks and chin of the generic or average face in towards the user's actual cheeks and chin. An example technique for fitting the shape model to a user's face is depicted in FIG. 4 and described below.

Figure 5:
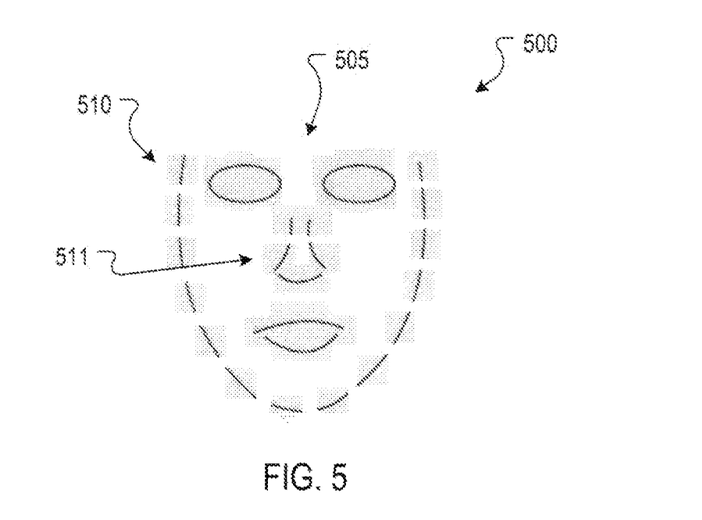
FIG. 5 depicts a diagram of template images for a user's face.

The gaze tracker 134 may generate a template image for each facial feature point of the user's face. A template image for a particular facial feature point is a portion of the image that includes the portion of the user's face at the facial feature point. To generate the template image for a particular facial feature, the gaze tracker 134 can extract a portion of the image at the location of the particular facial feature point. The portion is less than the entire image, e.g., a sub-portion of the image. For example, the gaze tracker 134 may extract, for one side of the user's right eye, a portion of the image at that position and that includes the side of the user's right eye and a portion of the image that immediately surrounds the side of the user's right eye, e.g., a portion of the image within a threshold number of pixels around the side of the user's right eye. An example of a set of template images generated for a user's face is depicted in FIG. 5 and described below.

The gaze tracker 134 can use the template images to determine the orientation of the user's face in other images, such as images received subsequent to the image used to generate the template images. In some implementations, the gaze tracker 134 compares the template images to portions of an image to determine whether portions of the image match the template images. For example, the gaze tracker 134 may compare each template image to one or more portions of the image that are close, e.g., within a threshold distance, to an area of a previous image that matched the template image. Consider, for example, an image in a video feed that immediately followed the image from which the template images were generated. The location and orientation of the user's face likely did not move or change significantly between the two images. Thus, the gaze tracker 134 may first compare a template image to an area in the subsequent image that corresponds to the location from which the template image was generated. For example, if a template image matches an image portion that was located in the bottom right corner of the previous image, the gaze tracker 134 may compare the template image to image portions located at or near the bottom right corner of the subsequent image. The gaze tracker 134 may compare the template image to portions of the subsequent image that are within a threshold distance, e.g., a threshold number of pixels, from where the image portion that matched the template image was found in the previous image. If no match is found in that area, the gaze tracker 134 may expand the comparison area further out or to the entire subsequent image. By starting near the previous location and expanding the comparison area in response to no match being found, data processing and memory resources may be conserved relative to an exhaustive or random comparison process.

To determine whether a portion of an image matches a template image, the gaze tracker 134 may compare visual characteristics of the template image to the image portion. For example, the gaze tracker 134 may compare colors, shapes, edges, and other characteristics of the template image to the image portion to determine how similar the image portion is to the template image. The gaze tracker 134 may, in some implementations, determine a similarity score based on the comparison of the image portion with the template image. The similarity score for a template image and an image portion may specify a level of visual similarity between the template image and the image portion. The gaze tracker 134 may compare the similarity score to a similarity threshold to determine whether the image portion matches the template image.

If the gaze tracker 134 finds a matching image portion for each template image, or at least a threshold number or percentage of template images, the gaze tracker 134 may determine that the user's face is depicted in the image. The gaze tracker 134 may also identify the relative locations of the image portions that match the template images. Using the relative locations, the gaze tracker 134 can determine the orientation of the user's face. For example, if the relative locations of the matching image portions indicate that the distance between the left side of the user's face and the tip of the user's nose is less than the distance between the right side of the user's face and the tip of the user's nose, then the gaze tracker 134 may determine that the user 105 is looking to the left.

The gaze tracker 134 can use the orientation of the user's face to determine what portion, if any, of the display 114 the user is viewing. In some implementations, the gaze tracker 134 uses the orientation of the user's face and information specifying the location of the user's face with respect to the display 114 to determine what portion of the display 114 the user is viewing. For example, the gaze tracker 134 may generate a vector of the user's viewing direction based on the orientation and the location of the user's face with respect to the display 114. The gaze tracker 134 may then project the vector onto the display 114 to determine what portion of the display 114 the user 105 is viewing.

In some implementations, the gaze tracker 134 performs a learning process to learn the location of the user's face with respect to the display 114. For example, the gaze tracker 134 may prompt the user 105 to look at various training locations on the display 114. For each training location, the gaze tracker 134 may determine which direction the user 114 is looking, for example, by comparing the template images for the user 105 to an image captured while the user 105 is looking in the prompted direction. The gaze tracker 134 can then use the viewing direction of the user 105 for each training location to determine the location of the user 105 with respect to the display 114. Consider, for example, a first training location in the top left corner of the display and a second training location at the bottom right of the display. If the user 105 is looking to the left for both training locations, the gaze tracker 134 may determine that the user 105 is located to the right of the display 114. The relative changes in the orientation of the user's face for the training locations can be used to refine the location of the user's face with respect to the display 114.

In some implementations, the gaze tracker 134 determines the location of the user's pupil in images. The gaze tracker 134 can detect the location of the user's pupils using circle detection techniques. For example, the gaze tracker 134 can use a Sobel filter and/or Hough transforms to detect the user's pupils in an image. The gaze tracker 134 can use the pupil location to refine the viewing direction of the user 105. For example, the gaze tracker 134 may determine a portion of the display 114 at which the user 105 is looking using the orientation of the user's face. The gaze tracker 134 may then determine a sub-portion of that portion of the display 114 based on the pupil location. If the user's pupils are to the left side and to the bottom of the user's eyes, the gaze tracker 125 may determine that the user 105 is looking at a sub-portion that is located to the bottom-left of the portion of the display 114.

The gaze-based UI controller 130 also includes a UI controller 136. The UI controller 136 can perform operations based on the user's viewing direction. For example, the UI controller 136 may cause an icon to be selected in response to the user 105 viewing the icon for at least a threshold amount of time or in response to the user 105 gesturing, e.g., eye blinking or head movement in a particular direction. The UI controller 136 may interact with applications to perform actions with respect to displayed objects. For example, if the user 105 is viewing text in a word processing application, the UI controller 136 may interact with the word processing application to perform an action on the text, such as highlighting or copying text.

The UI controller 136 may evaluate the user's viewing direction in multiple images to determine whether to perform an action and what action to perform. For example, to determine whether to select an icon, the UI controller 136 may determine whether the user 105 viewed the icon for a threshold amount of time based on the user 105 viewing the icon in multiple sequential images. The UI controller 136 can also determine whether a gesture was performed based on the orientation of the user's face and/or the status of the user's eyes in multiple images. For example, the UI controller 136 can determine if the user's head moved in a particular direction using the position of the user's face in sequential images. The UI controller 136 can also determine whether the user's eyes blinked based on whether the user's eyes were open in a first image, then closed in a second image, and then re-opened in a third image, the three images not necessarily being received directly after one another. Example actions performed by the UI controller 136 and gestures that can initiate the actions are described below with reference to FIG. 7.

Figure 2:
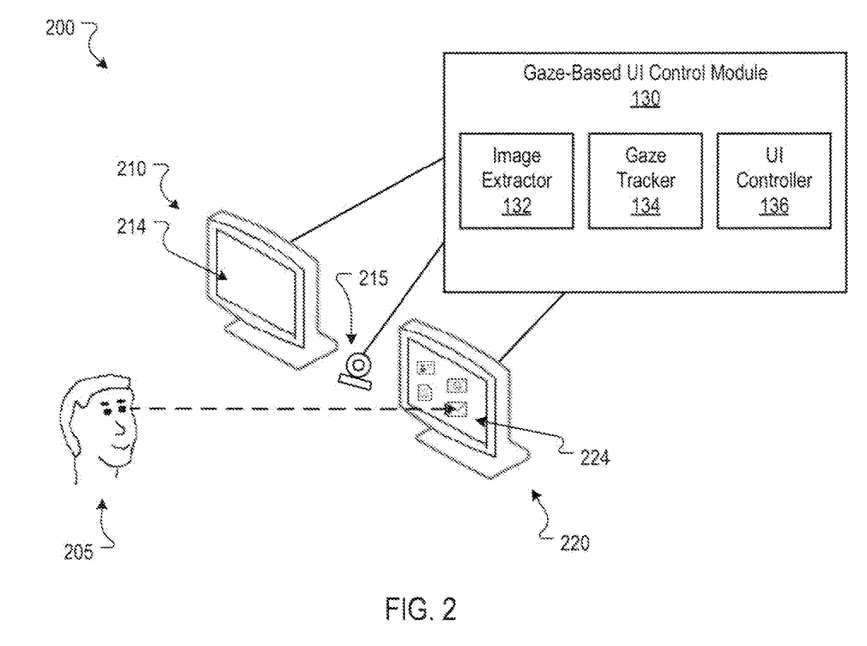
FIG. 2 is another environment in which an example gaze-based UI control module performs actions on displayed objects based on a viewing direction of a user.

The example gaze-based control module 130 can also be used to determine which of multiple devices or objects (e.g., objects in a vehicle) a user is viewing and perform actions based on the viewed device or object. FIG. 2 is another environment 200 in which the gaze-based UI control module 130 performs actions on displayed objects based on a viewing direction of a user 205. In this example, the gaze-based control module 130 is communicably coupled to two computers 210 and 220. The computer 210 includes a display 214 and the computer 220 includes a display 224. The gaze-based UI control module 130 is also communicably coupled to a camera 215, e.g., a webcam that can capture still images and/or video of the user 205.

The gaze tracker 134 of the gaze-based control module 130 can evaluate images of the user 205 to determine which display 214 or 224 the user is viewing. For example, the gaze tracker 134 can generate template images of the user 205 using an image of the user 205, as described above. The gaze tracker 134 can also use the template images to determine an orientation of the user's face in another image. Based on the orientation of the user's face and information identifying the location of the user 205 with respect to the displays 214 and 224, the gaze tracker 134 can determine which, if any, of the displays 214 and 224 the user 205 is viewing. For example, the gaze tracker 134 may generate a vector of the user's viewing direction based on the orientation of the user's face and the location of the user's face with respect to the displays 214 and 224. The gaze tracker 134 may then project the vector forward from the user's face to determine whether the user 205 is viewing one of the displays 214 and 224. The gaze tracker 134 can also use the vector to determine what portion or point on the display 214 or 224 the user 205 is viewing.

The gaze tracker 134 can also use a learning process to learn the location of the user's face with respect to the displays 214 and 224. For example, the gaze tracker 134 may prompt the user 105 to look at one or more training locations on the display 214 and one or more training locations on the display 224. An image can be captured while the user is looking at each training location, e.g., using the camera 215. The gaze tracker 134 can determine a viewing direction of the user 205 in each image by comparing template images for the user 205 to the images. The gaze tracker 134 can then use the viewing direction of the user 105 and the location for each training location to determine the location of the user's face with respect to the displays 214 and 224. For example, if the user 205 looks to the left to view the display 214 and to the right to view the display 224, the gaze tracker 134 may determine that the user's face is located between the two displays 214 and 224. If the user's head is turned further to view the display 214 than the head tilt to view the display 224, the gaze tracker 134 may determine that the user 205 is located closer to the display 224 than the display 214.

The UI controller 136 can activate a device based on the user's viewing direction. For example, if the gaze tracker 134 determines that the user 205 is looking at the display 214, the UI controller 136 may activate the computer 210. The UI controller 136 can also shift focus between devices based on the viewing direction of the user 205. For example, if the user 205 changes focus from the display 214 to the display 224, the UI controller 136 may shift focus to the computer 214. With focus shifted to the computer 214, the UI controller 136 may perform actions with respect to objects presented on the display 214 based on the user's viewing direction.

Although FIG. 2 is described with respect to displays 214 and 224, the gaze tracker 134 can determine which of multiple other types of objects the user 205 is viewing and cause actions to be performed at the objects. For example, the gaze tracker 134 may perform a learning process to learn the location of the user's face with respect to multiple objects or systems in a vehicle (e.g., radio, navigation system, climate control system, etc.). The gaze tracker 134 can then determine which of the objects the user 205 is viewing based on images of the user 205 and cause actions to be performed at the object being viewed. For example, if the user views a radio and gestures his head in a particular direction, the gaze tracker 134 may send a request to the radio (e.g., via a personal area network or wired connection) to the radio to adjust the volume. In this way, the user 205 can adjust the volume without taking his hands off of the steering wheel.

FIG. 3 depicts diagrams 305 and 310 of an example shape model that includes facial feature points 307 for a face. As described above, the shape model specifies the relative position of facial feature points 307 for a face, such as a generic face or an average face. The shape model can include facial feature points, which are represented by the dots in the face model, and data specifying the relative location of the facial feature points. The facial feature points 307 of the shape model may be for particular facial features of the face. For example, facial feature points 307 may outline the outside of the generic or average face, e.g., from one side of the head around the chin and to the other side of the head. Facial feature points 307 may also specify the shape of the face's lips, nose, eyes, pupil, eyebrows, or other facial features.

The face model may also specify, for example, the location of a base point, e.g., the top center of the face or the tip of the nose. For each other facial feature point 307, the face model may specify the location of that facial feature point 307 with respect to the base point. For example, the face model may specify, for the feature point for the center of the right eye of the face, that the center of the right eye is located at a particular distance from the base point and at a particular angle or in a particular direction with respect to the base point. Each line in the face model depicted in FIG. 3 indicates the relative location of the two facial feature points connected by the line.

The face model can be generated using images of multiple faces. In some implementations, the gaze tracker 134, or another component or system, evaluates images of faces to determine an average or typical location of each facial feature of a set of, e.g., predefined, facial features. For example, the gaze tracker 134 may identify an average location of each facial feature point with respect to a base point, such as the tip of the nose or some other point.

The set of facial feature points 307 may be predefined or learned by the gaze tracker 134. For example, a predefined set of facial feature points 307 may specify, for the nose, a facial feature point for the tip of the nose, a facial feature point for the center of each nostril, and a particular number of facial feature points to outline the nose. The face model may be generated using images in which the faces are directed at the camera as shown in the diagram 305 or images in which the face is looking to one side as shown in the diagram 310.

FIG. 4 depicts a shape model 415 that includes facial feature points 417 being fitted to an image of a user's face 412. In diagram 405, a shape model 415 that includes facial feature points 417 is superimposed over an image of a user's face 412. As the shape model 415 does not fit the image of the user's face 412, the facial feature points 417 of the shape model 415 are moved to align with the user's face 412.

To align the facial feature points 415 with the user's face 412, the gaze tracker 134 can identify the location of corresponding facial features of the user's face 412 and move the facial feature points 415 to the corresponding locations. For example, the gaze tracker 134 can identify the outline of the user's face 412 based on the border between the user's skin color and another color, such as background color. In this example, the outline of the user's face 412 is thinner than the shape model 415. Therefore, the gaze tracker 134 may move the facial feature points 417 in towards the outline of the user's face until the facial feature points 417 align with the outline of the user's face 412, as shown in the diagram 410. Similarly, the facial feature points 417 for the shape model's eyes, nose, and mouth can similarly be moved until they align with the corresponding features of the user's face.

The aligned facial feature points 417 make up the fitted shape model 420 for the user's face 412. The fitted shape model 420 specifies the relative location of the user's facial features. For example, the fitted shape model 420 may specify the location of each facial feature point 417 with respect to a base point or one of the facial feature points 417.

FIG. 5 depicts a diagram 500 of template images 510 for a user's face 505. In this example, template images 510 have been generated for facial feature points for the outline of the user's face 505, the user's mouth, the user's nose, the user's eyes, and the user's eyebrows. Each template image includes an image of its corresponding facial feature point on the user's face 505. For example, the template image 511 includes an image of the far right side of the user's nose. As described above, a template image may be generated for each facial feature point of a shape model. For example, a multitude of template images maybe generated for the user's nose to capture the shape and look of the user's nose. Each template image 510 may also be associated with its location on the user's face 505. The location of each template image 510 may be a relative location with respect to a base point (e.g., center of the face or another appropriate location). The relative location for a particular template image may specify the distance between the base point and the particular template image and a particular angle at which the particular image is located with respect to the base point.

Figure 6:
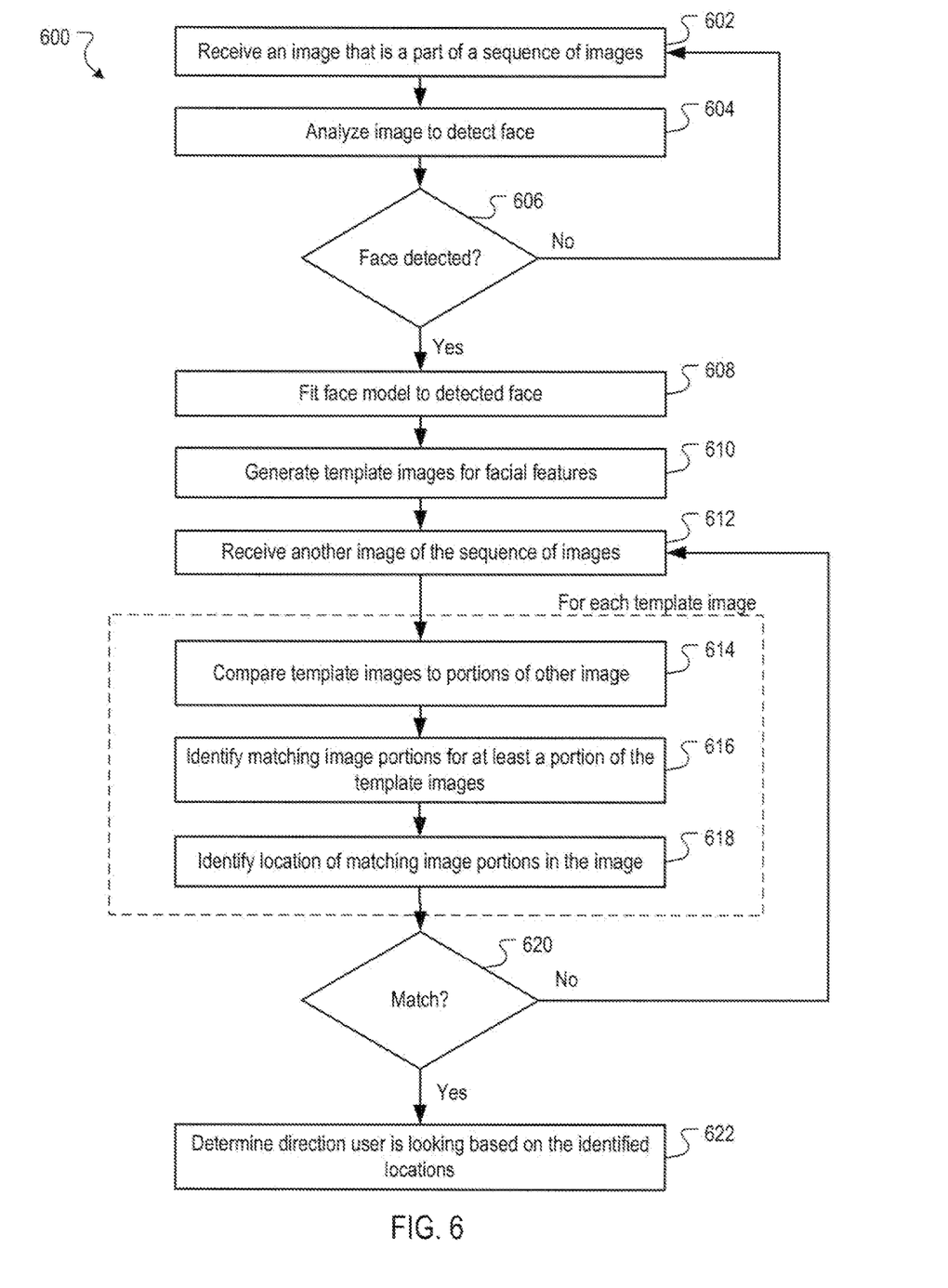
FIG. 6 is a flow chart of an example process for generating template images for a user's face and using the template images to determine a direction in which the user is looking.

FIG. 6 is a flow chart of an example process 600 for generating template images for a user's face and using the template images to determine a direction in which the user is looking. Operations of the process 600 can be implemented, for example, by a data processing apparatus, such as the gaze-based UI control module 130 of FIG. 1. The process 600 can also be implemented by instructions stored on computer storage medium, where execution of the instructions by a data processing apparatus cause the data processing apparatus to perform the operations of the process 600.

At block 602, an image is received. The image may be a part of a sequence of images. For example, the image may be extracted from a video feed received from a camera, such as the camera 116 of FIG. 1. The image may include the face of a user.

At block 604, the image is analyzed to detect a face in the image. For example, a gaze tracker, such as the gaze tracker 134 of FIG. 1 may apply one or more face detection techniques to the image to determine whether the image includes a face.

At block 606, a determination is made whether the image includes a depiction of a face. If a face is not detected in the image, another image is received and analyzed for the inclusion of a face. This face detection routine may repeat until a face is detected in an image of the sequence of images.

At block 608, if a face is detected in the image, a face model is fit to the user's face detected in the image. As described above, a face model specifies the relative location of facial feature points of a face, such as a generic face or an average face. For example, the face model may specify a set of facial feature points for particular facial features, such as an outline of the face, an outline of each eye, an outline of the nose, an outline of the mouth, and/or an outline of each eyebrow. For each facial feature point, the face model may specify a location of the facial feature point with respect to a base point or with respect to other facial feature points. In this way, the distance between two facial feature points can be determined. For example, the fit model may indicate that the eyes of the face are a particular distance apart.

The face model can be fit to the user's face in the image by superimposing a diagram of the face model over the user's face in the image. The location of facial feature points of the face model can then be adjusted to align with corresponding facial features of the user's face. For example, the facial feature points that outline a right eye of the generic or average face may be adjusted until the points align with the outline of the right eye of the user's face in the image.

The fitted face model can be used to quickly redetect the face and track the face in subsequent images. For example, if eyes (or other facial features) are detected in a subsequent image, then the relative location of other facial features can be estimated based on the location of the eyes in the subsequent image and their relative location in the fitted shape model with respect to the other facial features.

At block 610, template images are generated from the image for the facial features of the user. For example, a template image may be generated for each fitted facial feature point of the fitted shape model. Each template image can include an image of its corresponding facial feature. Each template image may also be associated with location data that specifies the location of its corresponding facial feature in the image. The location may be relative to another point, such as a base point.

At block 612, another image is received from the sequence of images. The received image may be an image received subsequent to the image from which the template images were generated. For example, the received image may be a subsequent frame of a video feed.

At block 614, the template images for the user's face are compared to portions of the received image. Each template image can be compared to one or more respective portions of the image. The template image may be compared to portions of the image that correspond to a portion of a previous image that matched the template image. For example, the template image may have been compared to a previous image to determine the orientation of a user's face in the previous image. The template image may have matched a portion of the previous image that is located at a particular location in the previous image. As the location and orientation of the user's face may not have changed substantially, the template image may be compared to image portions of the received image that correspond to the location in the previous image that matched the template image. If a matching image portion is not found in that location, then image portions located near the location, e.g., within a threshold number of image pixels, may be compared to the template image. If there is still no match, then other areas of the image may be compared to the template image.

As described above, a similarity score can be determined for each image portion compared to a particular template image that corresponds to a particular facial feature. The similarity score for an image portion can specify a level of similarity between the image portion and the template image.

At block 616, matching image portions are identified for at least a portion of the template images. In some implementations, the gaze tracker 134 may identify the image portion of the received image that most closely matches the template image as a matching image portion for the template image. For example, if multiple image portions are compared to a particular template image, the gaze tracker 134 may select an image portion that matches the template image based on the similarity scores for the compared image portions. In this example, the gaze tracker 134 may select the image portion having the highest similarity score that meets or exceeds a minimum similarity threshold.

Some template images may not have a matching image portion in the received image. For example, the received image may not have a corresponding portion that matches that template image due to the orientation of the user's face, a change in lighting, or the user's face may have partially moved out of the camera' view. Or, the user's face may have moved such that the facial feature may not be fully visible, such as one side of the nose when the user looks to one side.

At block 618, the location in the received image of each image portion that matches a template image is identified. The location of a matching image portion for a particular template portion can be associated with the particular template image. In this way, the location of the facial feature points that correspond to the template image can be identified and compared. For example, the gaze tracker 134 may determine that the template image for the tip of the user's nose matches an image portion located at particular coordinates in the received image. The gaze tracker 134 can associate those coordinates with the template image and thus, with the facial feature that corresponds to that template image.

At block 620, a determination can be made whether the received image sufficiently matches the template images for the user's face. For example, the gaze tracker 134 may only identify a matching image portion for a small percentage of the template images, e.g., less than a threshold percentage of the template images. This small percentage of match may make it unfeasible to use the location of the matching template images to determine the orientation of the user's face.

In some implementations, the gaze tracker 134 may determine whether the received image matches the template images based on a number of the template images that have a matching image portion in the received image. The gaze tracker 134 may also determine an aggregate score for the received image based on the individual similarity scores of the image portions determined to match the template images. If the aggregate score meets or exceeds a threshold score, the gaze tracker 134 may determine that the received image matches the template images for the user's face.

If it is determined that the received image does not match the template images for the user's face, the gaze tracker 134 may attempt to detect the user's face in another image, e.g., a subsequently received image. As the gaze tracker 134 has already generated a fitted face model and template images for the user's face, the gaze tracker 134 may compare the template images to subsequently received images to attempt to detect the user's face. If the gaze tracker 134 is unsuccessful, e.g., for a threshold number of images, the gaze tracker 134 may return to block 602 and re-execute the face detection techniques to determine whether images of a face are being captured. For example, a different user may now be in front of the camera and the different user's face may not match that of the previous user for which the template images were generated. If a face is detected, the gaze tracker 134 may fit the shape model to the detected face and generate template images for the detected face.

Other conditions that may lead to a decrease in the value of the aggregate score and trigger a fallback to block 602 for redetection are rapid head movements and significant changes in lighting conditions. For example, a rapid head movement may result in a blurry image or in some of the facial features being out of the camera's view. Similarly, significant changes in lighting can make images captured after the lighting change differ from the template images captured during different lighting conditions. The conditions can cause the aggregate score to drop below a threshold and therefore trigger the redetection of a face.

Returning to block 620, if it is determined that the received image does not match the template images for the user's face, the direction the user is looking may be determined based on the identified locations for the template images in the received image. The gaze tracker 134 may evaluate the relative locations of the template images to determine the orientation of the user's face in the received image. For example, the gaze tracker 134 may consider the distances between particular template images. The gaze tracker 134 may determine the distance between the image portion that matches the template for the tip of the user's nose and the image portion that matches the template image for each side of the user's face. If the distance from the tip of the nose to the left side of the user's face is shorter than the distance from the tip of the nose to the right side of the user's face, the gaze tracker 134 may determine that the user is looking to the left. In addition, the gaze tracker may determine how far to the left the user is looking based on the difference between the two distances. The gaze tracker 134 may also determine the angle of the user's viewing direction based on the difference between the distances. For example, if the distances are similar, then the user may be looking slightly to the left. If the distances vary significantly, the user may be looking further to the left.

The gaze tracker 134 can further determine the location on a display at which the user is looking based on the orientation of the user's face and information identifying the location of the display with respect to the user's face. For example, the gaze tracker 134 may generate a vector based on the orientation of the user's face and project the vector onto the display based on the location of the display with respect to the user's face. As described above, an action can be performed with respect to an object presented on the display based on the user's viewing direction.

Figure 7:
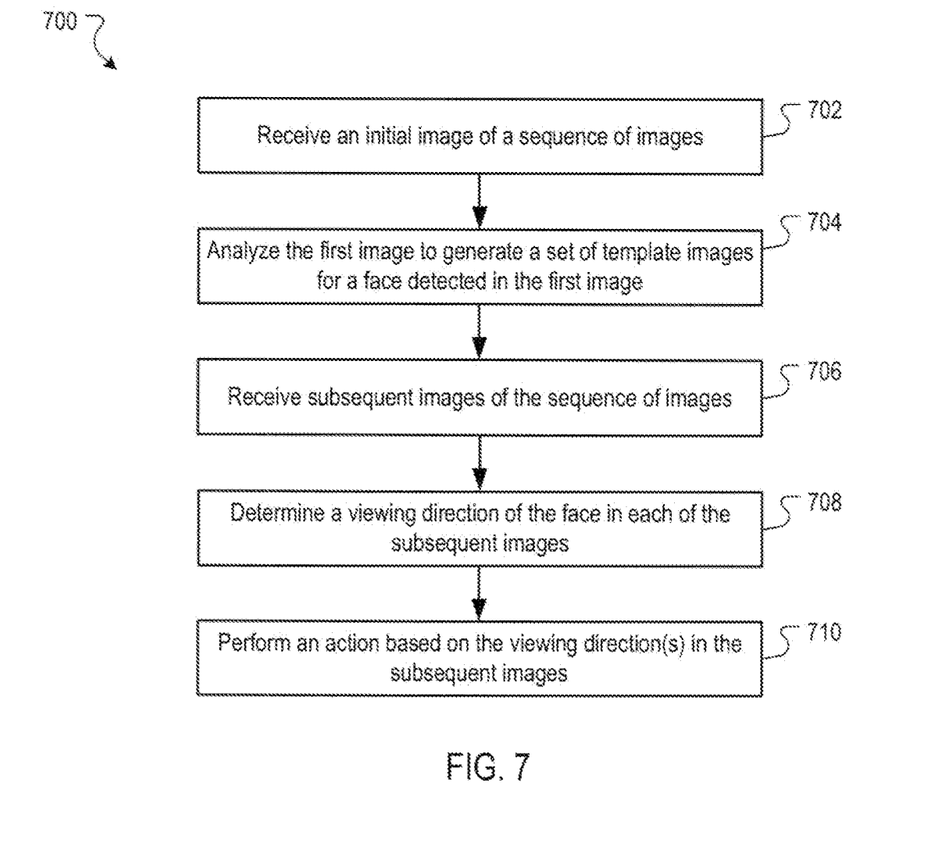
FIG. 7 is a flow chart of an example process for performing a UI action based on a viewing direction of a user.

FIG. 7 is a flow chart of an example process 700 for performing a UI action based on a viewing direction of a user. Operations of the process 700 can be implemented, for example, by a data processing apparatus, such as the gaze-based UI control module 130 of FIG. 1. The process 700 can also be implemented by instructions stored on computer storage medium, where execution of the instructions by a data processing apparatus cause the data processing apparatus to perform the operations of the process 700.

At block 702, an initial image of a sequence of images is received. For example, the initial image may be an image extracted from a video feed for a user. The initial image does not have to be the first image in the sequence and can instead be any one of the images that have been captured by a camera.

At block 704, the initial image is analyzed to generate a set of template images for a face detected in the first image. For example, the template images may be generated as described above.

At block 706, subsequent images of the sequence of images are received. The subsequent images may also be extracted from a video feed for the user.

At block 708, a viewing direction of the user is determined for each of the subsequent images. The viewing direction for a particular image may specify a location on a display that the user was viewing in that particular image, for example, if the user was viewing the display. The viewing direction for the particular image can be determined by comparing portions of the image to the template images to determine the orientation of the user's face in the particular image. A vector of the user's viewing direction can then be projected onto the display, for example, based on the location of the display with respect to the user's face, as described above.

At block 710, an action is performed based on the viewing direction(s) in the subsequent images. The action performed can be based on what portion of the display the user viewed and/or based on user gestures detected. For example, if the user looks at a particular icon for at least a threshold amount of time, e.g., for a threshold number of subsequent images, the icon may be selected. Or, if the user views a particular icon and makes a gesture, such as eye blinking, eye widening, or nodding, the icon may be selected.

The gaze tracker can detect certain gestures based on the orientation of the user's face in sequential images or that status of particular facial features in sequential images. For example, a nod of the user's head can be detected based on the changing orientation of the user's face in sequential images. Blinking of the eyes can be detected based on the open or closed status of the eyes in sequential images. Widening of the eyes can be detected based on the height of the eyes in sequential images. For example, if the height of the eyes increases and then decreases, the gaze tracker 134 may determine that the user's eyes widened.

The position of a UI object can be moved based on the movement of the user's face or eyes. For example, the UI controller 136 may determine to select an object based on the user viewing the object for at least a threshold amount of time. The object may also be highlighted on the display to indicate that the object has been selected. The user can then move the object by looking in a different direction or moving. For example, if the user's head moves such that the user is looking to the right of the object, the UI controller 136 may move the object to the right (e.g., to the location that the user is looking) in response to the viewing direction of the user changing. Or, the UI controller 136 may move the object in response to pupil movement in a particular direction. A mouse cursor can similarly be moved about a display based on the user's viewing direction or eye movement.

Text input can also be received using an on-screen keyboard. For example, the user may look at a character for at least a threshold amount of time. In response to detecting the user's viewing of the character, the character may be selected. Or, the user may select the character by blinking or nodding while viewing the character.

Other actions can be performed in response to the user looking at an object for a threshold amount of time, such as resizing a window, selecting text, and/or scrolling in a text document or web page. For example, if the user looks at a selectable control for a threshold amount of time, such as a window resizing control, a scroll bar, or a window minimizer control, the control may be selected. A gesture, such as eye blinking, can also be used to select a control while the user is viewing the control.

Head movements can also be used to move between multiple windows that are hidden behind other windows. For example, in response to detecting that the user's head is leaning forward, the UI controller 136 may cycle through the windows.

Figure 8:
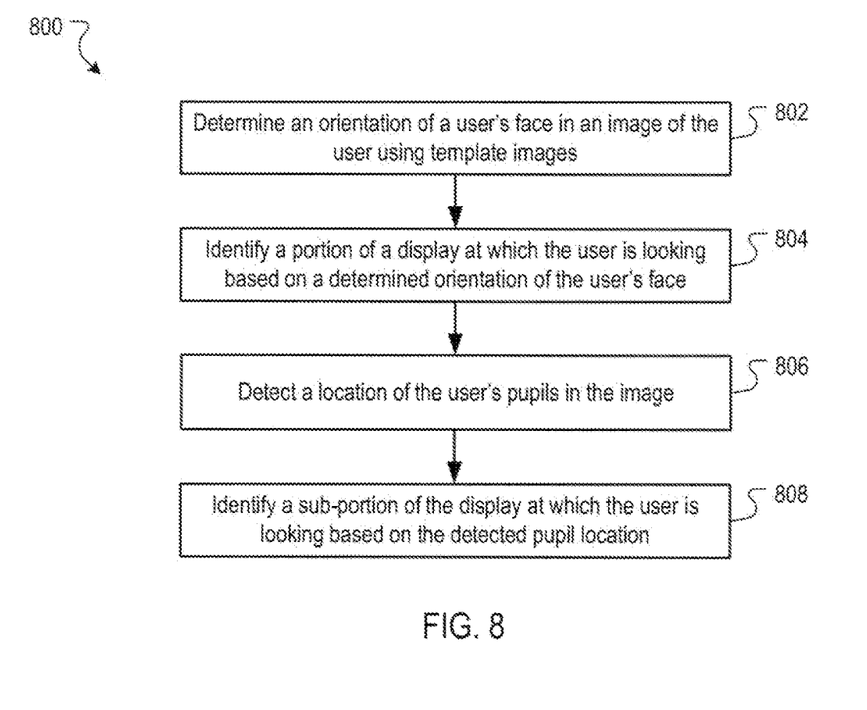
FIG. 8 is a flow chart of an example process for identifying a location of a display at which a user is looking using template images and a location of the user's pupil in an image.

FIG. 8 is a flow chart of an example process 800 for identifying a location of a display at which a user is looking using template images and a location of the user's pupil in an image. Operations of the process 800 can be implemented, for example, by a data processing apparatus, such as the gaze-based UI control module 130 of FIG. 1. The process 800 can also be implemented by instructions stored on computer storage medium, where execution of the instructions by a data processing apparatus cause the data processing apparatus to perform the operations of the process 800.

At block 802, an orientation of the user's face in an image is determined using template images. For example, the image may be an image extracted from a video feed for the user. The orientation of the user's face may be determined by comparing template images of the user's face to the image, as described above.

At block 804, a portion of a display at which the user is looking is determined based on the orientation of the user's face. For example, the portion of the display may be determined using the orientation of the user's face and information specifying the location of the user's face with respect to the display. A vector of the user's viewing direction can then be generated and projected onto the display, for example, based on the location of the display with respect to the user's face. The portion of the display at which the vector is projected may be identified as the portion of the display that the user is viewing. The portion of the display may also include an area around the location of the display at which the vector is projected. For example, the portion of the display may include a predetermined amount of display area in each direction from the vector's projected location on the display.

At block 806, a location of each of the user's pupils is detected in the image. For example, the location of the user's pupils can be detected using circle detection techniques.

At block 808, a sub-portion of the display at which the user is looking is identified based on the detected pupil location. The sub-portion may be a sub-portion of the portion identified in block 804. For example, the pupil location may be used to refine the viewing location determined based on the orientation of the user's face.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a first image of a sequence of images, the first image determined to depict at least a face of a user;
   in response to determining that the first image depicts the face, fitting a shape model to the face, the fitting including:
      identifying, for the face, a shape model that includes one or more facial feature points; and
      fitting the shape model to the face in the first image to generate a fitted shape model by adjusting a location of each of the facial feature points of the shape model to overlap with a corresponding facial feature point of the face in the first image; and
   generating, from the first image and based on the fitted shape model, a template image for each facial feature point of the face in the first image, the template image for each facial feature point of the face depicting a portion of the face at a location of the facial feature point of the face in the first image, the portion of the face for each template image being less than all of the face;
   for each subsequent image in the sequence of images:
      for each facial feature point of the face:
         comparing the template image for the facial feature point of the face to a respective image portion of the subsequent image located at a same location in the subsequent image as a location at which the facial feature point of the face was identified in a previous image; and
         for at least one facial feature point of the face for which the facial feature point's template image does not match the respective image portion, comparing the template image for the at least one facial feature point to one or more additional image portions of the subsequent image until a match is found between the template image for the at least one facial feature point and one of the one or more additional image portions; and
      determining, for the subsequent image, a direction in which the user is looking based on a location of a matching image portion in the subsequent image for each facial feature point of the face.

2. The method of claim 1, further comprising identifying the one additional image portion of the subsequent image for the at least one facial feature point by:
   determining a similarity score for each of the one or more additional image portions of the subsequent image, the similarity score for a particular additional image portion of the subsequent image specifying a level of similarity between the template image for the at least one facial feature point and the particular additional image portion; and
   selecting the additional image portion having the greatest similarity score as a matching image portion.

3. The method of claim 1, wherein determining the direction in which the user is looking based on the location of a matching image portion in the subsequent image for each facial feature point of the face comprises determining an orientation of the user's face in the subsequent image based on a relative location of the matching image portion for each facial feature point of the face.

4. The method of claim 1, further comprising:
   determining that the user is looking at a particular object presented on a display based on the determined direction in which the user is looking; and
   causing an operation to be performed on the particular object in response to determining that the user is looking at the particular object.

5. The method of claim 4, wherein determining, for the subsequent image, that the user is looking at a particular object presented on the display comprises determining that the user is looking at the particular object based on a location of a pupil of the user in the subsequent image and the determined direction.

6. The method of claim 1, further comprising:
   determining a portion of a display at which the user is looking based on the determined direction in which the user is looking;
   detecting a location of a pupil of the user in the subsequent image; and
   determining a sub-portion of the portion of the display at which the user is looking based on the location of the pupil.

7. The method of claim 6, further comprising:
   receiving an additional subsequent image of the sequence of images, the additional subsequent image being received subsequent to receipt of the subsequent image;
   determining that the user is looking at the portion of the display based on the additional subsequent image;
   determining that a location of the pupil in the additional subsequent image is different from the location of the pupil in the subsequent image; and
   causing an operation to be performed on a user interface element displayed in the portion of the display in response to determining that the location of the pupil in the additional subsequent image is different from the location of the pupil in the subsequent image.

8. The method of claim 7, wherein the operation comprises moving a cursor across the display based on the location of the pupil in the subsequent image and the location of the pupil in the additional subsequent image.

9. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
receiving a first image of a sequence of images, the first image determined to depict at least a face of a user;
in response to determining that the first image depicts the face, fitting a shape model to the face, the fitting including:
identifying, for the face, a shape model that includes one or more facial feature points; and
fitting the shape model to the face in the first image to generate a fitted shape model by adjusting a location of each of the facial feature points of the shape model to overlap with a corresponding facial feature point of the face in the first image; and
generating, from the first image and based on the fitted shape model, a template image for each facial feature point of the face in the first image, the template image for each facial feature point of the face depicting a portion of the face at a location of the facial feature point of the face in the first image, the portion of the face for each template image being less than all of the face;
for each subsequent image in the sequence of images:
for each facial feature point of the face:
comparing the template image for the facial feature point of the face to a respective image portion of the subsequent image located at a same location in the subsequent image as a location at which the facial feature point of the face was identified in a previous image; and
for at least one facial feature point of the face for which the facial feature point's template image does not match the respective image portion, comparing the template image for the at least one facial feature point to one or more additional image portions of the subsequent image until a match is found between the template image for the at least one facial feature point and one of the one or more additional image portions; and
determining, for the subsequent image, a direction in which the user is looking based on a location of a matching image portion in the subsequent image for each facial feature point of the face.

10. The system of claim 9, wherein the operations further comprise identifying the one additional image portion of the subsequent image for the at least one facial feature point by:
determining a similarity score for each of the one or more additional image portions of the subsequent image, the similarity score for a particular additional image portion of the subsequent image specifying a level of similarity between the template image for the at least one facial feature point and the particular additional image portion; and selecting the additional image portion having the greatest similarity score as a matching image portion.

11. The system of claim 9, wherein determining the direction in which the user is looking based on the location of a matching image portion in the subsequent image for each facial feature point of the face comprises determining an orientation of the user's face in the subsequent image based on a relative location of the matching image portion for each facial feature point of the face.

12. The system of claim 9, wherein the instructions upon execution cause the data processing apparatus to perform further operations comprising:
determining that the user is looking at a particular object presented on a display based on the determined direction in which the user is looking; and
causing an operation to be performed on the particular object in response to determining that the user is looking at the particular object.

13. The system of claim 9, wherein the instructions upon execution cause the data processing apparatus to perform further operations comprising:
determining a portion of a display at which the user is looking based on the determined direction in which the user is looking;
detecting a location of a pupil of the user in the subsequent image; and
determining a sub-portion of the portion of the display at which the user is looking based on the location of the pupil.

14. The system of claim 13, wherein the instructions upon execution cause the data processing apparatus to perform further operations comprising:
receiving an additional subsequent image of the sequence of images, the additional subsequent image being received subsequent to receipt of the subsequent image;
determining that the user is looking at the portion of the display based on the additional subsequent image;
determining that a location of the pupil in the additional subsequent image is different from the location of the pupil in the subsequent image; and
causing an operation to be performed on a user interface element displayed in the portion of the display in response to determining that the location of the pupil in the additional subsequent image is different from the location of the pupil in the subsequent image.

15. The system of claim 14, wherein the operation comprises moving a cursor across the display based on the location of the pupil in the subsequent image and the location of the pupil in the additional subsequent image.

16. A non-transitory computer storage medium encoded with a computer program, the program comprising instructions that when executed by a data processing apparatus cause the data processing apparatus to perform operations comprising:
receiving a first image of a sequence of images, the first image determined to depict at least a face of a user;
in response to determining that the first image depicts the face, fitting a shape model to the face, the fitting including:
identifying, for the face, a shape model that includes one or more facial feature points; and
fitting the shape model to the face in the first image to generate a fitted shape model by adjusting a location of each of the facial feature points of the shape model to overlap with a corresponding facial feature point of the face in the first image; and generating, from the first image and based on the fitted shape model, a template image for each facial feature point of the face in the first image, the template image for each facial feature point of the face depicting a portion of the face at a location of the facial feature point of the face in the first image, the portion of the face for each template image being less than all of the face;

for each subsequent image in the sequence of images:
for each facial feature point of the face:
  comparing the template image for the facial feature point of the face to a respective image portion of the subsequent image located at a same location in the subsequent image as a location at which the facial feature point of the face was identified in a previous image; and
for at least one facial feature point of the face for which the facial feature point's template image does not match the respective image portion, comparing the template image for the at least one facial feature point to one or more additional image portions of the subsequent image until a match is found between the template image for the at least one facial feature point and one of the one or more additional image portions; and
determining, for the subsequent image, a direction in which the user is looking based on a location of a matching image portion in the subsequent image for each facial feature point of the face.

* * * * *